United States Patent
Quinn et al.

[15] 3,702,569
[45] Nov. 14, 1972

[54] SYSTEM FOR ELIMINATING GYRO ON-OFF DRIFT EFFECTS

[72] Inventors: James A. Quinn, Ridgewood; William J. Owen, Netcong; Garry Terpstra, Pompton Plains, all of N.J.

[73] Assignee: The Singer Company, Little Falls, N.J.

[22] Filed: Nov. 19, 1970

[21] Appl. No.: 90,920

[52] U.S. Cl. ..................74/5.47, 74/5.7, 318/167
[51] Int. Cl. .............................................G01c 19/48
[58] Field of Search ....318/167, 174, 175, 179; 74/5, 74/5.47, 5.7

[56] References Cited

UNITED STATES PATENTS

| | | |
|---|---|---|
| 3,264,881 | 8/1966 | Poklar et al..................74/5 X |
| 3,336,810 | 8/1967 | Schaffer et al....................74/5 |
| 2,577,912 | 12/1951 | Perkins et al...............74/5.47 |
| 3,044,309 | 7/1962 | Buchhold........................74/5 |
| 3,170,103 | 2/1965 | Kutik.....................318/167 X |
| 3,365,959 | 1/1968 | Quermann.......................74/5 |

*Primary Examiner*—Manuel A. Antonakas
*Attorney*—S. A. Giarratana and Thomas W. Kennedy

[57] ABSTRACT

Solid rotor synchronous motor gyroscope having two-phase square wave supply voltage; control circuitry including logic circuit components for periodically producing a phase shift in the motor excitation voltage that results in slow relative rotation between the electrical field and the solid rotor; gyro drift errors varying sinusoidally in sense and magnitude in accordance with the relative rotation between field and rotor, balance out during each complete cycle of relative rotation.

10 Claims, 6 Drawing Figures

INVENTORS
WILLIAM J. OWEN
JAMES A. QUINN
GARRY TERPSTRA
BY
ATTORNEY

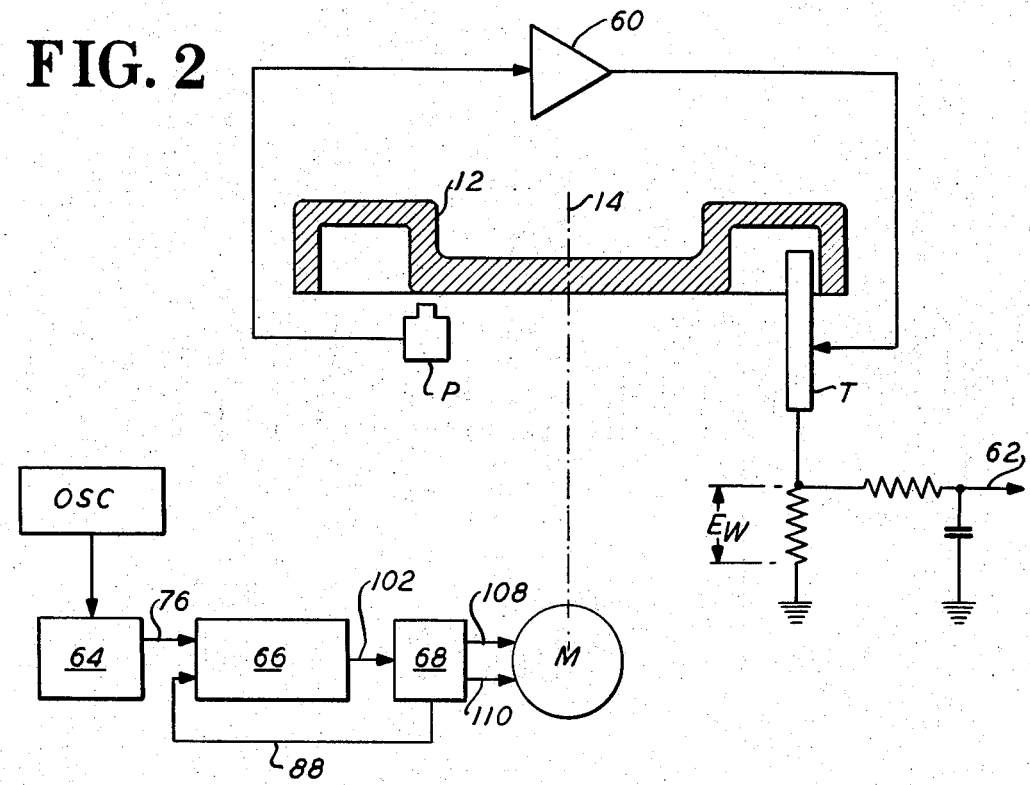
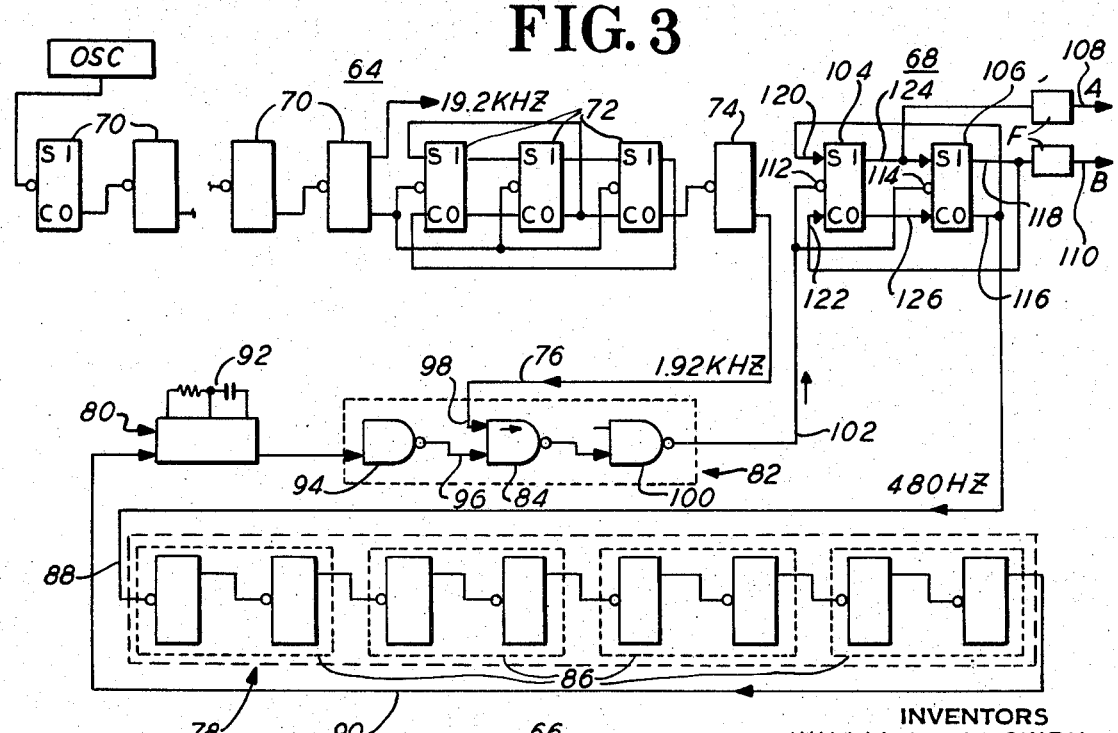

SYSTEM FOR ELIMINATING GYRO ON-OFF DRIFT EFFECTS

BACKGROUND OF THE INVENTION

This invention relates especially to instrument gyros of the high precision type, such as for example those used in flight navigation systems for indicating the instant flight position in relation to a reference or origin point. For ensuring accuracy in position plotting or charting, very precise information must be obtained from the heading gyro; otherwise, even slight heading errors could result in large position errors. Also, in space navigation, stable platform gyros such as used in inertial guidance systems, require the greatest precision possible in the art.

A long-standing problem in the operation of instrument gyros has been drift error. In addition to the usual calculated gyro precession or normal drift, so-called "random drift" errors are also present. Some of these errors are unavoidable such as those due to basic bearing resistance, etc.; other random type drift errors appear to be characteristic of the type of gyro in question.

Such a drift error appears to be characteristic of most solid rotor synchronous motor gyroscopes. Here, it was found that when the gyro was initially turned on and the rotor had become electrically locked in synchronism with the field, a small drift error that remained uniform or constant during rotor-field lock, was produced in addition to the basic random drift; however, this error although constant during a given synchronous operation of the gyro, tended to be different in apparently random manner for each subsequent on-off operation of the gyro. The cause or causes of such gyro bias shifts due to on-off effects of the gyro or spin motor are not fully known; it has been suggested that possible causes include (1) anisoelastic torque (due to rectification of vibration) applied to the gyro wheel, and (2) interaction between the magnetic fields of the motor rotor and the gyro torquer magnet respectively, among others.

Prior to this invention, no satisfactory way had been found for either stabilizing or cancelling this characteristic drift error, hereinafter termed "on-off drift." An empirical method for reducing the error to an acceptable minimum might consist of making a number of gyro starts until a low value of observed on-off drift rate appears; however, due to the time usually required for each synchronized gyro start, the probability of long delays makes such multiple starts highly impractical.

Accordingly, the present invention is concerned with single-start gyro operation together with material improvement in the drift characteristics of solid rotor synchronous motor gyroscopes.

SUMMARY OF THE INVENTION

In accordance with this invention, the drift characteristics of a solid rotor, synchronous motor gyroscope are greatly improved by eliminating the net drift effects incident to on-off operation of the gyro. To this end, the two-phase motor excitation voltage is conveniently in the form of square wave pulses, and at fixed time-intervals a square wave pulse of each phase is varied in width 90° by logic circuitry. The resulting periodic phase shift of field relative to rotor necessitates re-synchronization at a new point on the rotor periphery; the resulting stepping action therefore amounts to a slow continuous rotation or precession of the field with respect to the rotor.

As the on-off drift error was found by experimentation to be proportional in magnitude to the sine of the phase angle between a fixed point on the rotor and the cross-over (or 0° angle) of the electrical field, the precession of the field about the rotor results in an orderly sinusoidal variation of the on-off drift error. Accordingly, the equal and opposite positive and negative values of on-off drift balance out effectively within a complete cycle of field precession, so that aside from normal drift, the net effect of gyro drift error is now reduced to a bare minimum, i.e. basic random drift.

A principal object of the invention therefore, is to provide an improved instrument gyro control system wherein the on-off drift effects in a solid rotor synchronous motor gyroscope are eliminated.

Another and more specific object is to provide in a control system of the character above, electronic means for periodically re-synchronizing the electrical field and the rotor of the gyro motor at progressively spaced points along the rotor periphery for causing the field to precess slowly around the rotor and thereby cancel the effect of on-off drift error.

Another and related object is to provide an efficient, reliable and comparatively inexpensive control system of the character above, wherein the electronic means consists of compact, low weight, standard integrated logic components that can without complication, be easily assembled to make up the complete system.

Other objects, features and advantages will appear from the following description with reference to the accompanying drawings.

BRIEF DESCRIPTION OF DRAWINGS

In the drawings:

FIG. 2 is a schematic diagram generally illustrating a gyro control system embodying the invention;

FIG. 3 is a flow-type diagram of logic element circuitry generally indicated in the control system of FIG. 2;

DESCRIPTION OF PREFERRED EMBODIMENT

Figure 1:
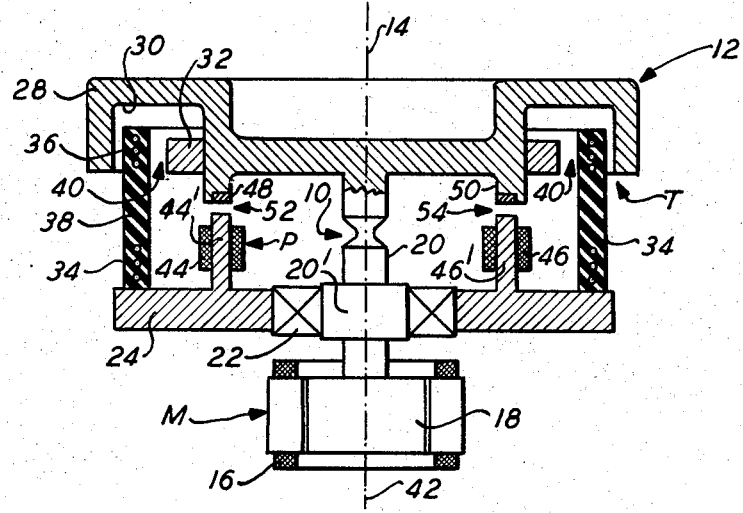
FIG. 1 is a partly sectional view of one form of synchronous motor gyroscope to which the present invention is applicable.

The invention which has special application to solid rotor synchronous motor gyroscopes, is not limited to any specific type in this category. For example, as indicated by FIG. 1, the gyro can be of the two-axis type having a flexible coupling schematically indicated at 10 between the gyro wheel 12 and the drive or spin motor M. The spin axis of the gyro is indicated at 14. The spin motor is of synchronous type having a winding 16 and solid rotor 18, the latter being connected through a drive shaft 20 including the coupling 10, to the gyro wheel 12. The shaft is journalled at an enlarged portion 20' in a bearing 22 that is mounted in a relatively fixed support or base plate 24 constituting part of the gyro casing or housing (not shown).

For providing two-axis freedom of movement, the shaft coupling 10 constitutes a suitable form of universal joint such for example, as that described in U.S. Pat. No. 3,354,726 for "Two-Axis Gyro," assigned to the same assignee as the present invention.

The configuration of the gyro wheel 12 lends itself to the functions of the torquer generally indicated at T and the pick-off at P. The peripheral portion 28 of the wheel is made of magnetic material and forms an annular channel 30 having an invented U-shape cross-section as illustrated. A ring-type permanent magnet 32 (polarized at its inner and outer peripheries) is mounted on the inner peripheral wall of the channel 30 in operative relation to torquer coils generally indicated at 34. The torquer coil windings 36, one for each quadrant, are embedded in an insulating cylinder 38 that extends in telescopic manner partly into the channel 30 and into an annular gap 40 formed between the outer channel wall and ring magnet 32. The coil-supporting cylinder 38 is mounted on the main support 24 in concentric relation to the longitudinal axis 42 of the rotor shaft 20. This axis and the spin axis 14 are in alignment when the gyro wheel is in a null position, as shown.

When precession of the spin axis is detected by the pick-up P, the resulting signal causes correcting torque to be applied to the wheel in obvious manner according to respective energization of torquer quadrant windings and interaction of the respective magnetic fields in the gap 40.

The pick-off signal device comprises a plurality of peripherally spaced coils 44, 46, etc., that are mounted on the support 24, and a relatively movable permanent magnet-ring 48. This magnet is mounted on the gyro wheel at 50 in concentric relation to the torquer magnet 32, and is vertically aligned with the peripherally spaced magnetic cores 44', 46', etc. of the pick-off coils 44 and 46 respectively, to form air gaps 52, 54, etc., that are of equal length in the null position of the gyro. Precession (tilting) of the wheel 10 (and spin axis) with consequent air gap variations, produces unequal coil voltages and a resultant pick-off signal.

For the purposes of this invention, further descriptions of the torquer and pick-off arrangements are not essential; for more detailed descriptions thereof, reference is made to U.S. Pat. No. 3,438,270 for "Two-Axis Torquer" assigned to the same assignee as the present invention.

A gyro control system embodying the invention and including a gyro such as that described above, is schematically shown in simplified form by FIG. 2. In the control mode shown by way of example, the gyro wheel 12 driven by the spin motor M is related to the pick-up P and torquer T in conventional manner; i.e. gyro precession is detected by the pick-up and the resulting signal is amplified at 60 for causing the torquer to apply a correcting torque to the wheel. If a "rate capture" system is used, the torquer output can be represented by a potential $E_W$ for producing a read-out signal at 62, this signal corresponding to the total gyro drift rate W. This can be represented as made up of two components, i.e.

$$W = W_E + W_B$$

where $W_E$ is the drift rate due to on-off error, and $W_B$ is the basic random drift rate.

The present invention is concerned with eliminating the error effect of $W_E$.

Referring first in general terms to FIG. 2, the spin motor M is energized from a constant frequency source represented by oscillator OSC, that in the example shown may have a frequency of 1.2288 MHZ. The output frequency of the oscillator is fed to a stage 64 where it is progressively divided in conventional manner by flip-flop circuitry, until the resulting square-wave pulse train is reduced to a frequency of 1.92 KHZ. The stage output at this frequency constitutes a main input to a pulse processing and gating stage 66 wherein periodic pulse suppression takes place as hereinafter described. The single train of pulses from stage 66, still at 1.92 KHZ and now pulse suppressed at repetitive time intervals, is fed to a final phase shifting and frequency dividing stage 68, the output of which constitutes a two-phase, 90° dephased, 480 HZ supply voltage for the spin motor. Conventional filtering indicated at F can if desired, be used for smoothing the square pulses into the usual sinusoidal form although this is not necessary for the frequency here used. This supply voltage includes the repetitive phase shift for controlling the spin motor according to the invention. The stage 66 also has a second gating control input that is derived from the final stage 68 for periodic timing control of the aforesaid pulse train phase shift.

Referring specifically now to FIG. 3, the oscillator output (1.2288 MHZ) is first fed to series-connected single flip-flops 70 (six, in the present instance) for initially halving by steps and reducing the frequency of the square wave pulses derived from the flip-flops to 19.2 KHZ, as indicated. Further reduction of the frequency by one-fifth, i.e. to 3.84 KHZ, is achieved by three interconnected flip-flops 72 in known manner, and a last stage single flip-flop 74 halves this frequency to 1.92 KHZ. The square wave pulse train at this frequency constitutes the output on line 76 from stage 64 to the "quad gate" circuitry of stage 66.

Essentially, stage 66 comprises a so-called "countdown" system generally indicated at 78 for producing a comparatively low frequency inhibiting pulse, a single-shot multivibrator 80 with R-C circuit for determining the single-shot pulse duration (or width), and a quad gating arrangement 82 that includes a NAND gate 84. The count-down circuit at 78 consists of four dual flip-flops 86, series-connected as indicated, for a frequency reduction ratio of 256 to 1. The input side of the dual flip-flops is connected by line 88 to an energizing potential at 480 HZ taken from the final stage 68 as presently described, and the output side is connected by line 90 to the input side of the "single-shot" 80. Thus, it will be seen that the single-shot receives signals only at very low frequency intervals, i.e. one pulse for each train of 256 pulses at a frequency of 480 HZ.

The output of the single-shot 80 is a single square wave pulse having a width that exceeds that of the 1.92 KHZ pulses at the gate input 76, i.e. the constants of the R-C time-circuit 92 are so selected that the duration of the output pulse is 150 percent of a single 1.92 KHZ pulse cycle. This widened pulse is fed through a gate 94 functioning here simply as an inverter, and constitutes the gating signal at input terminal 96 of the NAND gate 84. As mentioned above, the 1.92 KHZ voltage from line 76 constitutes the other gate input at terminal 98.

Figure 4:
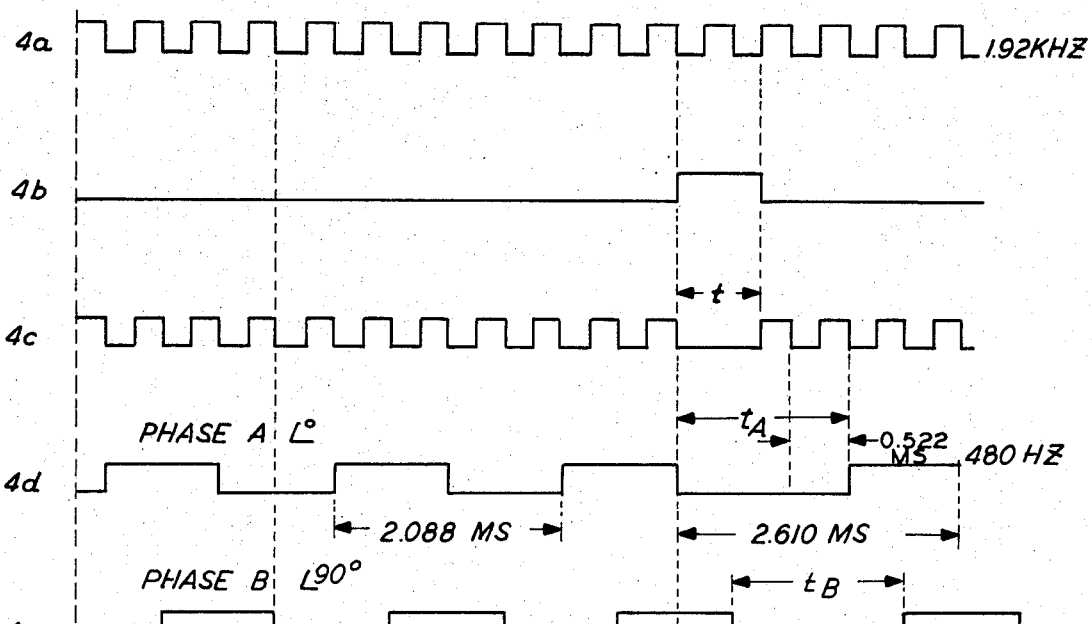
FIG. 4 shows voltage oscillograms for representing periodic phase shift in the circuitry of FIG. 3.

For a graphical explanation of the pulse gating, reference is made to the common time base oscillograms of FIG. 4. The first square wave oscillogram 4-a is that of the 1.92 KHZ voltage input at the gate input 98, and so constitutes a uniform pulse train. The multivibrator single-shot gating or inhibiting pulse at gate input 96 is shown at 4-b. Here the single pulse at a low frequency of approximately 1.953 per second, has a width that corresponds on the time base to 1½ times the full pulse cycle shown in 4-a. Accordingly, upon each occurrence of the gating pulse at the gate input 96, a full pulse of the 1.92 KHZ voltage is suppressed or inhibited. The resulting pulse train is passed through an inverter 100 and the output at gate terminal 102 is represented by 4-c.

This output is fed by line 102 to the final stage 68 that comprises two flip-flops 104 and 106 that are interconnected as diagrammatically indicated for producing at separate output lines 108 and 110 respectively, periodically phase shifted pulse trains. The square wave pulse trains shown at 4-d and 4-e constitute a two-phase 90° de-phased voltage at virtually 480 HZ for energizing the spin motor according to the invention. The flip-flops 104 and 106 as interconnected constitute a pulse processing digital system commonly known as "modulo four." The phase A and B pulse trains at output lines 108 and 110 are formed according to the clock or timing pulses of the 1.92 KHZ pulse train 4-C in relation to the so-called "set" (S) and "clear" (C) conditions of the two flip-flops, 104 and 106. Modern technology utilizes master-slave type flip-flops, i.e., a single flip-flop unit as herein used actually includes two conventional flip-flops. The set-clear logic controls the first or master flip-flop, and the data is transferred from the master flip-flop to the second or slave flip-flop at the instant the clock signal falls to zero. The clock signal 4-C is simultaneously applied to the clock input terminals 112 and 114 of the flip-flop units 104 and 106 respectively: the C and S outputs at 116 and 118 of flip-flop 106 are connected respectively, to the S and C inputs at 120 and 122 of the flip-flop 104, and the S and C outputs of flip-flop 104 are connected respectively, by lines 124 and 126 to the corresponding S and C inputs of flip-flop 106.

Thus, in accordance with the modulo-four program, the S output of flip-flop 104 on line 124 for phase A will, for a uniform clock train, consist of a single uniformly wide pulse for every four clock pulses. That is, the phase A frequency will be one-fourth of the clock frequency, or 480 HZ. The S output of flip-flop 106 for phase B will be similar except that the pulse start will lag by two clock pulses the corresponding pulse of phase A. As a result, phase B will be de-phased 90° with respect to phase A.

The 480 HZ pulse trains of phases A and B, FIG. 4, will be subject to phase shifts as mentioned, each time the clock oscillogram 4-C, completes 256 timing pulses. Due to the suppression of a full clock pulse for the time interval $t$, the formation of the succeeding phase A pulse (4-d) and the 90° lagging phase B pulse (4-e) are correspondingly delayed for establishing the phase shift intervals $t_d$ and $t_e$ respectively. This phase shift, as indicated, amounts to 90° electrical, in the filtered supply voltage for the spin motor. As the spin motor in the present instance is of the 4-pole synchronous type, a field shift of 45°, mechanical, at the rotor periphery takes place for each phase shift of the supply voltage. The motor field is thereby stepped by this amount to successively new synchronizing points in a slow rotation around the rotor. In other words, the phase shifting system as described forces the motor field to re-write a new pattern of hysteresis loops on the rotor at each phase shift, thereby re-synchronizing the field and rotor at progressively spaced points on the rotor and causing the field to precess around the rotor.

For each such re-synchronization the normal rotor speed is not significantly affected since rotor inertia is sufficient to maintain the rotor at its rated speed during the very brief interval (approximately 0.522 milliseconds) of shift.

It will be apparent that the direction of relative rotation of the field with respect to the rotor is immaterial in practicing the invention. For example, the gating pulse, 4-b, could be timed for changing the clock signals so that the time intervals $t_a$ and $t_b$ would be but 90° rather than 270° electrical thereby causing the synchronizing field to precess in the opposite direction.

For an understanding of the effect of field precession as described above, on the gyro bias that causes on-off drift, research leading to the invention will be discussed briefly. An important factor in making the invention was the discovery of a predictable pattern within which the on-off drift occurred. It was found after analyzing a considerable amount of data covering many on-off gyro operations, that the drift rates ranged between values defining positive and negative limits of about the same magnitude. This led to the conclusion, later confirmed, that the error-producing bias was related sinusoidally to the relative angular position of the synchronized field and a fixed point on the rotor.

Figure 6:
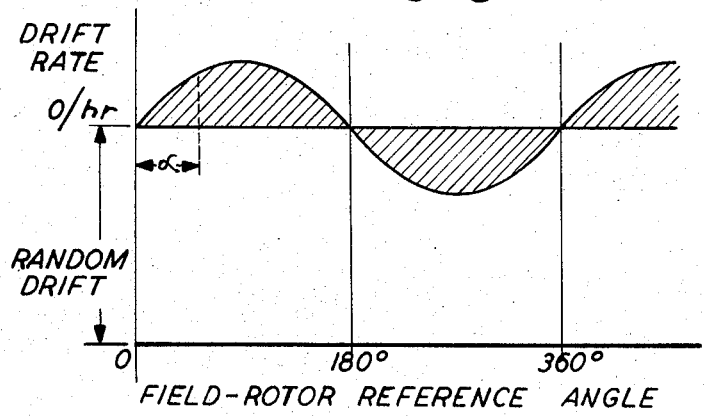
FIG. 6 is a graph of cyclic variation of on-off drift error as related to FIG. 5.
Figure 5:
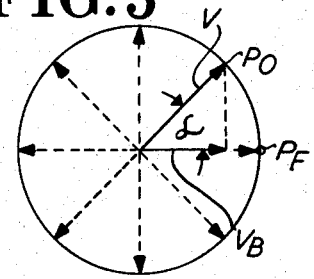
FIG. 5 is a circle diagram for illustrating vectorially gyro bias shifts.

For a graphical explanation of the relation between progressive phase shift and gyro bias resulting in the on-off drift error, reference is made to the diagrams of FIGS. 5 and 6. The circle diagram of FIG. 5 shows a free rotating bias vector V representing successive stepped re-synchronization positions of field and rotor.

Considering first the conventional situation wherein the bias for a given gyro operation remains constant, it will be assumed that point $P_o$ is the cross-over, or 0° position of the motor field on the rotor, and that $P_F$ is a fixed reference point on the rotor of the specific gyro in question. The bias vector V may be considered to be at point $P_o$, thereby defining angle $\alpha$ between the vector and fixed point $P_F$. According to the relationship established above, the on-off drift bias for this situation is proportional to sin $\alpha$ and remains constant during the gyro operation at a value represented by vector $V_B$. For the next gyro operation, the cross-over point might be at any angular position with respect to point $P_F$, and in such case the drift bias would depend in magnitude and in sense on the sine of the new angle so formed.

It will now be apparent that phase shifting of the gyro motor field according to the invention, results in controlling in an orderly rather than random manner, the position of $P_O$, and hence the bias vector V may be assumed as progressively rotating to the evenly spaced angular positions represented by dotted lines.

The resultant sinusoidal relationship of the gyro bias and angle $\alpha$ is shown by FIG. 6. The drift error which corresponds to this bias tends to balance out over repeated cycles of substantially equal positive and negative value, so that only the basic random drift indicated at R remains. Accordingly, it is seen that the invention although not eliminating on-off gyro bias itself, nevertheless eliminates the net effect of this bias during a normal gyro operation. In this respect, marked improvement in gyro performance is achieved where the invention is used.

Having set forth the invention in what is considered to be the best embodiment thereof, it will be understood that changes may be made in the system and apparatus as above set forth without departing from the spirit of the invention or exceeding the scope thereof as defined in the following claims.

What is claimed is:

1. In an instrument gyro system having a gyro wheel and a synchronous motor with solid rotor for driving the gyro wheel, the gyro system being characterized by a drift rate that remains uniform during a given synchronized period, and that is different in random manner for succeeding on-off gyro operations, the method of eliminating the error-effects of the aforesaid on-off gyro drift that comprises, supplying an alternating voltage to the motor while producing a timing pulse train of frequency higher than the motor supplied frequency, shifting periodically the phase of the supply voltage by periodically suppressing a pulse of the timing train, and timing the voltage phase shift by controlling the duration of the suppressing pulse, for repetitively causing re-synchronization of the supply voltage field and the rotor at spaced points respectively, along the rotor periphery whereby the field slowly precesses around the rotor.

2. The method as specified in claim 1, wherein the periodic phase shift causes re-synchronization in equally spaced steps around the rotor periphery.

3. The method as specified in claim 1 wherein periodic phase shift is achieved by changing the duration of a pulse following a given train of pulses of the supply voltage.

4. The method as specified in claim 2 wherein the phase of the motor supply voltage is shifted 90° for causing shift of the field 45°, mechanical, with reference to a fixed point on the rotor.

5. The method as specified in claim 3 wherein the change in pulse duration is 90° electrical.

6. A control system including an instrument gyro having a gyro wheel and a synchronous motor with solid rotor for driving the gyro wheel, the gyro being characterized by a drift rate that remains uniform during a given synchronized period, and that is different in random manner for succeeding on-off gyro operations, said control system comprising means for supplying alternating voltage to the synchronous motor, and modifying means connected to the voltage supply means for repetitively producing a phase shift in the supply voltage, the modifying means including phase-shift timing means for causing the supply voltage field to precess slowly around the rotor for suppressing the error-effect of the aforesaid on-off gyro drift wherein the voltage supply means includes means for producing a timing pulse train, and the phase shifting means comprises means for periodically suppressing a pulse of the timing train, and means controlled by the so-modified pulse train for producing a phase-shifted alternating current.

7. A control system including an instrument gyro having a gyro wheel and a synchronous motor with solid rotor for driving the gyro wheel, the gyro being characterized by a drift rate that remains uniform during a given synchronized period, and that is different in random manner for succeeding on-off gyro operations, said control system comprising means for supplying alternating voltage to the synchronous motor, and modifying means connected to the voltage supply means for repetitively producing a phase shift in the supply voltage, the modifying means including phase-shift timing means for causing the supply voltage field to precess slowly around the rotor for suppressing the error-effect of the aforesaid on-off gyro drift, wherein the voltage supply means includes means for producing a timing pulse train of frequency higher than the motor supplied frequency, and the phase shifting means comprises means for periodically suppressing a pulse of the timing train, and pulse responsive circuitry controlled by the so-modified pulse train for producing a phase shifted, two-phase, alternating current supply voltage for the gyro motor.

8. A control system as specified in claim 7 wherein the pulse responsive circuitry consists of multiple flip-flops inter-connected for producing the two-phase supply voltage.

9. A control system as specified in claim 7 wherein frequency dividing means is connected to the voltage supply means for producing a comparatively low frequency suppressing pulse, and electronic gating circuitry is jointly responsive to the suppressing pulse and to the timing pulse train for producing the modified pulse train.

10. A control system as specified in claim 9 wherein the duration of the suppressing pulse is controlled in relation to the duration of a suppressed pulse by a one-shot multivibrator having a time-constant control.

* * * * *